US011111933B2

United States Patent
Desclee et al.

(10) Patent No.: US 11,111,933 B2
(45) Date of Patent: Sep. 7, 2021

(54) PASSIVE FLUIDIC VALVE FOR FIXED FLOW RATE DISTRIBUTION

(71) Applicant: SAFRAN AERO BOOSTERS S.A., Herstal (BE)

(72) Inventors: Quentin Desclee, Herstal (BE); Maxime Vandenbroucke, Herstal (BE)

(73) Assignee: SAFRAN AERO BOOSTERS S.A., Herstal (BE)

( * ) Notice: Subject to any disclaimer, the term of this patent is extended or adjusted under 35 U.S.C. 154(b) by 0 days.

(21) Appl. No.: 16/849,240

(22) Filed: Apr. 15, 2020

(65) Prior Publication Data
US 2020/0333808 A1 Oct. 22, 2020

(30) Foreign Application Priority Data

Apr. 17, 2019 (BE) .................................... 2019/5254

(51) Int. Cl.
*F15B 13/02* (2006.01)
*G05D 11/03* (2006.01)
(Continued)

(52) U.S. Cl.
CPC ............ *F15B 13/022* (2013.01); *B64C 13/00* (2013.01); *G05D 11/03* (2013.01);
(Continued)

(58) Field of Classification Search
CPC .................. G05D 11/003; G05D 11/03; Y10T 137/2521; Y10T 137/2524;
(Continued)

(56) References Cited

U.S. PATENT DOCUMENTS 2,266,921 A * 12/1941 Trautman ............... F15B 13/022
137/101
2,643,664 A * 6/1953 Willett .................. F15B 13/022
137/101
(Continued)

FOREIGN PATENT DOCUMENTS

GB           852687 A      10/1960

OTHER PUBLICATIONS

Rapport de Recherche/Opinion Écrite, dated Dec. 5, 2019, issued in corresponding Belgian Application No. BE2019/5254, filed Apr. 17, 2019, 9 pages.

*Primary Examiner* — William M McCalister
(74) *Attorney, Agent, or Firm* — Christensen O'Connor Johnson Kindness PLLC

(57) ABSTRACT

A passive fluidic valve for fixed flow rate distribution comprising: a hollow valve body; a valve member for blocking a passage to one of the two outlets; and communications to impose the pressure of the upstream and downstream cavities at the ends of the valve member. The valve body further comprises: an inlet; a first outlet comprising a first restriction delimiting an upstream cavity and a downstream cavity; a second outlet comprising a second restriction delimiting an upstream cavity and a downstream cavity; and a first and a second cavity. The valve member further comprises: a first end in the first cavity delimiting a first and a third chambers, and a second end in the second cavity delimiting a second and a fourth chambers.

15 Claims, 2 Drawing Sheets

(51) Int. Cl.
  *B64C 13/00* (2006.01)
  *F16K 11/065* (2006.01)
  *F16K 27/04* (2006.01)

(52) U.S. Cl.
  CPC .............. *F15B 2211/4053* (2013.01); *F15B 2211/40507* (2013.01); *F15B 2211/40523* (2013.01); *F15B 2211/428* (2013.01); *F16K 11/065* (2013.01); *F16K 27/04* (2013.01)

(58) Field of Classification Search
  CPC .. Y10T 137/2657; F16K 11/04; F16K 11/065; B64C 13/00; F15B 2211/40507; F15B 2211/40523; F15B 2211/4053; F15B 2211/428; F15B 13/02
  USPC .................................... 137/100, 101, 118.04
  See application file for complete search history.

(56) References Cited

U.S. PATENT DOCUMENTS

| | | | | |
|---|---|---|---|---|
| 2,956,577 A * | 10/1960 | Kirkham | ............... | F15B 13/022 137/101 |
| 3,347,254 A * | 10/1967 | Compton | .............. | F15B 13/022 137/101 |
| 3,421,533 A * | 1/1969 | Conn | .................... | F15B 13/022 137/101 |
| 3,426,784 A * | 2/1969 | Vick | ....................... | B64C 13/00 137/99 |
| 3,437,103 A * | 4/1969 | Yoshino | ................ | F16K 11/065 137/100 |
| 3,722,525 A * | 3/1973 | Epple | ........................ | F15C 3/04 137/106 |
| 3,924,650 A * | 12/1975 | Parquet | .................. | F15B 13/022 137/101 |
| 4,121,601 A * | 10/1978 | Presley | .................. | B60K 17/10 137/101 |
| 4,250,909 A * | 2/1981 | Adams | ..................... | B62D 5/08 137/101 |
| 4,325,400 A * | 4/1982 | Wynne | ..................... | F15B 11/22 137/101 |
| 4,465,089 A * | 8/1984 | Inhofer | .................. | F15B 13/022 137/101 |
| 4,509,548 A * | 4/1985 | Grasso | .............. | H01M 8/04104 137/99 |
| 4,807,657 A * | 2/1989 | Van Den Bergh | ...... | F17C 13/02 137/101 |
| 4,877,057 A * | 10/1989 | Christensen | ............. | A62C 5/02 137/625.48 |
| 5,165,233 A * | 11/1992 | Betz | ...................... | F15B 11/162 137/101 |
| 5,782,260 A * | 7/1998 | Jacobs | ..................... | B62D 5/07 137/118.02 |
| 5,960,809 A * | 10/1999 | Keller | ................ | F02M 37/0023 137/100 |
| 10,578,221 B2 * | 3/2020 | Roseman | .............. | F15B 13/022 |
| 10,670,155 B2 * | 6/2020 | Patterson | ................ | E21B 34/16 |
| 10,974,296 B2 * | 4/2021 | Knie | ....................... | F15B 13/02 |
| 2016/0230900 A1 * | 8/2016 | Schulz | .................. | F16K 11/105 |
| 2020/0272178 A1 * | 8/2020 | Kozaki | .............. | G05D 16/2073 |
| 2020/0333808 A1 * | 10/2020 | Desclee | ................ | F15B 13/022 |

* cited by examiner

PASSIVE FLUIDIC VALVE FOR FIXED FLOW RATE DISTRIBUTION

TECHNICAL FIELD

Embodiments of the disclosure relate to a three-way fluidic valve for a fixed and automatic distribution of outlet flow rates.

BACKGROUND

Proportional fluidic valves are known and allow to distribute an inlet flow rate to at least two outlets by varying a fluid passage to each outlet in proportion to the position of a moving element, usually called a spool. In this way, it is possible to distribute outlet flow rates in relation to an inlet flow rate by varying the position of the spool.

For the same setting of the fluid passages to each outlet, variations in the pressure drop in the pipes connected to the outlets can lead to a change in the distribution of the flow rates to the outlets of the valve. One way to maintain the same flow rate distribution to each outlet is to readjust the fluid passages to each outlet to account for variations in pressure drop. This can be done, for example, by moving the spool by a solenoid actuator, thus requiring the use of an electric control.

SUMMARY

According to a first aspect, one of the purposes of the present disclosure is to provide a passive fluidic valve for obtaining a fixed distribution of an inlet flow rate between two outlets, without having to use an electric control.

For this purpose or others, the inventors propose the following fluidic valve. For example, in an embodiment, a passive fluidic valve for a hydraulic circuit of an equipment of an aircraft comprises
  a hollow valve body comprising:
    an inlet,
    a first outlet comprising a first restriction delimiting an upstream cavity of first outlet and a downstream cavity of first outlet,
    a second outlet comprising a second restriction delimiting an upstream cavity of second outlet and a downstream cavity of second outlet,
    a first cavity,
    a second cavity,
  a valve member movable in the valve body comprising:
    a first end located in the first cavity so as to at least partially delimit a first and a third chambers in the first cavity,
    a second end located in the second cavity so as to at least partially delimit
  a second and a fourth chambers in the second cavity,
  the fluidic valve further comprising:
    a first fluid communication between the first chamber and the upstream cavity of first outlet;
    a second fluid communication between the third chamber and the downstream cavity of first outlet;
    a third fluid communication between the second chamber and the upstream cavity of second outlet;
    a fourth fluid communication between the fourth chamber and the downstream cavity of second outlet.

With the fluidic valve according to embodiments of the disclosure, it is possible to automatically take into account a variation in pressure at one of the outlets in order to maintain a given distribution of outlet flow rates. In other words, it is possible to passively distribute fixed outlet flow rates regardless of the pressure drops downstream of the outlets.

Embodiments of the fluidic valve comprise an inlet and two outlets and a valve member serving as a control member for distributing the inlet flow rate among its outlets. A fixed restriction is present, for example, in each of the two outlets. The pressure drop generated by each of the first and second fixed restrictions allows for the generation of an upstream pressure and a downstream pressure at each of the restrictions so that these pressures act as a hydraulic force on either side of the ends of the valve member. This is accomplished, for example, by the first, second, third and fourth fluidic communications as described above.

With steady-state flow, the pressure drops across both outlets are constant, resulting in a resultant force on the valve member that is zero. A change in pressure in one of the outlets (due to downstream elements) will cause a change in the flow rate distribution in each of the two outlets. Since the distribution of the flow rates is changed, the pressure drops at the first and second restrictions will no longer be similar, which will create a resultant force on the spool until these two pressure drops become equal again (so that the same flow rate distribution between the two outlets is achieved as the initial distribution), by changing the position of the spool.

With embodiments of the fluidic valve, the position of the control element (valve member) can be adjusted, for example, without the need for an actuator so that the flow rate distribution between the two outlets remains constant when the downstream hydraulic conditions change.

With embodiments of the fluidic valve, it is possible to have a passive flow rate distributer which does not require any electronic systems. Embodiments of the fluidic valve are particularly robust because it does not include any electronic elements or mechanical actuators to control the position of the valve member. Thus, one of the advantages of the present disclosure is the passive control capability of the valve, which does not require any actuator or control loop and thus reduces its mass and costs related to the actuator and its control electronics. Another advantage of the disclosure is that the mechanical complexity of the moving parts is less than for an active valve, which also makes its operation more robust.

Embodiments of the fluidic valve maintain a fixed flow rate distribution between the two outlets by the action of the valve member. Thus, when there is a decrease in flow rate in the pipe connected to the first outlet, there is in the first and second variable restrictions between the first and second outlets, a reduction in the second variable restriction and an increase in the first due to the change in the pressures of the upstream and downstream cavities communicated to the ends of the valve member by the fluidic communications. Such movement of the valve member to adjust the first and second variable restrictions maintains a fixed flow rate distribution between the two outlets. The decrease in flow rate in the first pipe results in changes in the pressures in the upstream and downstream cavities which are automatically reflected at the ends of the valve member to maintain this fixed flow rate distribution between the two outlets.

In some embodiments, the upstream cavity of first outlet and the downstream cavity of first outlet are located on either side of the first restriction. In some embodiments, upstream cavity of second outlet and the downstream cavity of second outlet are located on either side of the second restriction.

In some embodiments, the valve member is movable in the valve body to at least partially block a passage between the inlet and one of the two outlets.

In some embodiments, the first and/or second restrictions are fixed restrictions. In some embodiments, the first outlet is a first outlet pipe which comprises the upstream cavity of first outlet and the downstream cavity of first outlet. In some embodiments, the second outlet is a second outlet pipe which comprises the upstream cavity of second outlet and the downstream cavity of second outlet.

The first chamber is between, for example, the valve body and the outer face of the first end of the valve member. The third chamber is between, for example, the first inner wall of the valve body and the inner face of the first end of the valve member. The second chamber is between, for example, the valve body and the outer face of the second end of the valve body. The fourth chamber is between, for example, the second inner wall of the valve body and the inner face of the second end of the valve body.

In some embodiments, the upstream cavity of first outlet is distinct from the upstream cavity of second outlet.

In some embodiments, the inlet on the one hand and the first and second outlets on the other hand are positioned upstream and downstream with respect to the valve member in a normal direction of fluid flow when the fluidic valve is in operation. Such a configuration allows for a more compact fluidic valve. Such a configuration would also allow for better sensitivity in taking into account variations in pressure drop downstream, i.e. in the outlets. In such a configuration, the position of the valve member does not influence the consideration of downstream pressure drop variations.

In some embodiments, the hollow valve body further comprises: a first inner wall comprising a first opening and at least partially defining the first cavity, a second inner wall comprising a second opening and at least partially defining the second cavity, the valve member passing through the first and second inner walls via their first and second openings.

In some embodiments, the valve member further comprises: a first and a second intermediate portions each configured to at least partially block a passage between the inlet and one of the two outlets, such that: the first intermediate portion at least partially delimits a first intermediate chamber with the first inner wall; and the second intermediate portion at least partially delimits a second intermediate chamber with the second inner wall.

This embodiment provides a response of the valve member in response to a change of the pressures which allows a balancing of the flow rates as defined by the geometry of the fluidic valve of the disclosure. In some embodiments, the first intermediate portion of the valve member defines, together with the valve body, a first variable restriction between the inlet and the first outlet. In some embodiments, the second intermediate portion of the valve member defines with the valve body, a second variable restriction between the inlet and the second outlet.

In some embodiments, there is:
  a first intermediate fluid communication between the first intermediate chamber and the inlet, and;
  a second intermediate fluid communication between the second intermediate chamber and the inlet.

The first and second intermediate fluid communication allows a balancing of the pressures between the first and second intermediate chambers and the pressure at the inlet or to the first and second outlets.

In some embodiments, the first intermediate portion and the second intermediate portion form a first and second variable restrictions with the first and second outlets respectively.

A purpose of the first and second intermediate portions, is to form, depending on their positions within the valve body, two variable restrictions to the first and second outlets. In some embodiments, the first and second intermediate portions are attached to the valve member and form variable restrictions which are proportional, i.e. irrespective of the position of the valve member and thus the position of the first and second intermediate portions in the valve body, the sum of the passage sections to the first and second outlets is constant.

In some embodiments, the first end is fitted in the first cavity, and the second end is fitted in the second cavity, so that the first and second chambers have very small leakages, e.g., they are sealed, from the third and fourth chambers respectively. The leakage is minimized to avoid disturbing the operation of the valve. Fitted means that there is a clearance between the valve body and the first ends allowing movement and lubrication. Fitted can be interpreted as a necessary clearance between a piston in a cylinder, for example in a combustion engine.

The first and second ends of the valve member are sealing walls in the first and second cavities. The seal formed by these walls is important to ensure the proper functioning of the valve of the disclosure. A poor seal at the walls would cause poor communication of the pressures coming from either side of the restrictions located in the outlets, and thus malfunction of the valve.

In some embodiments, the first end delimiting the first and third chambers in the first cavity has a section having a first end area $S1$, and the second end delimiting the second and fourth chambers in the second cavity has a section having a second end area $S2$, such that the first end area $S1$ is equal to the second end area $S2$.

These embodiments are particularly advantageous because it allows a symmetrical valve member and the distribution of the outlet flow rates to be fixed on the basis of the passage dimensions of the fixed restrictions $R1$ and $R2$. Thus, it is possible to use the valve of the disclosure with $S1=S2$ in such a way that a symmetrical valve member can be used for a wide range of fixed flow rates between the two outlets by only changing the dimensions of the fixed restriction passages $R1$ and $R2$. This is very advantageous because the modification of $S1$ and $S2$ requires the modification of the valve member and the valve body, whereas the modification of the dimensions of the fixed restriction passages $R1$ and $R2$ can be done easily. Thus, the first and second restrictions can be adapted to the requirements of the flow rate distribution between the first and second outlets.

In some embodiments, the first end delimiting the first and third chambers in the first cavity has a section having a first end area $S1$, and the second end delimiting the second and fourth chambers in the second cavity has a section having a second end area $S2$, so that the first end area $S1$ is larger than the second end area $S2$.

For example, when $S1$ is larger than $S2$, then for fixed restriction passages $R1=R2$, the valve of the disclosure is configured to have a flow rate distribution such that the flow rate is greater to the second outlet.

In some embodiments, the first restriction has a first passage section $R1$, and the second restriction has a second passage section $R2$, such that the first passage section $R1$ is equal to the second passage section $R2$.

For example, for a fixed distribution of an inlet flow rate of 100%, into outlet flow rates of 50% to the first outlet and 50% to the second outlet, then S1=S2 and R1=R2 should be considered. It is interesting to note that such a flow rate distribution can be achieved with S1 different from S2 and R1 different from R2, e.g. when S2 is smaller than S1 and R2 is smaller than R1 or vice versa. However, it is much simpler to consider S1=S2 and R1=R2 in terms of design and manufacture for such a distribution of outlet flow rates.

In some embodiments, the first restriction has a first passage section R1, and the second restriction has a second passage section R2, such that the first passage section R1 is larger than the second passage section R2.

In some embodiments, the first restriction has a first passage section R1, and the second restriction has a second passage section R2, so that the first passage section R1 is smaller than the second passage section R2.

In both of the previous embodiments, e.g. S1=S2, so that the flow rate distribution between the two outlets is based on the dimensions of the fixed restrictions R1 and R2 (R1≠R2). Thus, a larger flow rate is fixed to the first outlet when R1 is larger than R2 and vice versa.

Displacement force means a force which has a direction and an orientation along a possible orientation of movement of the movable valve member. The term restriction or 'fixed restriction' is familiar to a person skilled in the art. Different types of fixed restriction can be considered. A non-limiting example is a circular hole drilled in a wall whose thickness is of the same magnitude as its diameter. Other examples are a bend, a diameter narrowing.

Embodiments of the fluidic valve have other advantages. It can be cheaper than other existing solutions. It would also have good performance.

In some embodiments, the communication to the external pressure includes a filter. This meets the need for clean fluid.

In some embodiments, the valve member has rotational symmetry.

Embodiments of the fluidic valve can be used with different fluids such as: oil, engine oil, fuel. Embodiments of the fluidic valve could be used with other fluids. In some embodiments, the fluidic valve of the disclosure includes one or more filters or anti-pollution devices (e.g. seals, leakage paths) to reduce the risk of blockage of the valve member. The fluidic valve of the disclosure can be used in a hydraulic circuit of an equipment of an aircraft such as, for example, the hydraulic circuit of a landing gear.

The inventors also propose: a hydraulic circuit of an equipment of an aircraft (e.g. hydraulic circuit of a landing gear), a fuel cell system, a turbomachine, and an aircraft, each comprising one or more fluidic valves according to one or more embodiments of the disclosure.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
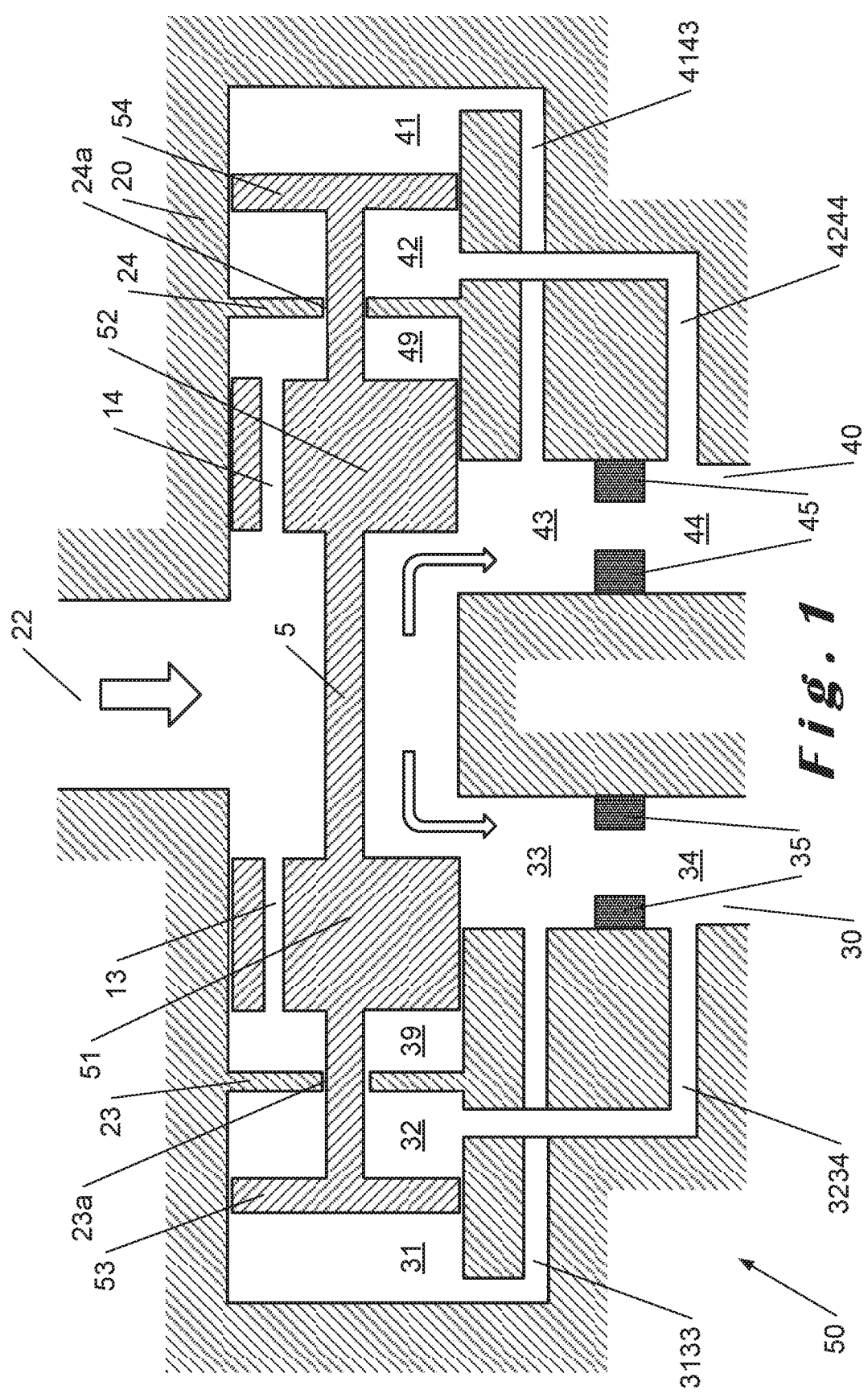
FIG. 1 illustrates an embodiment of the fluidic valve according to the disclosure.
Figure 2:
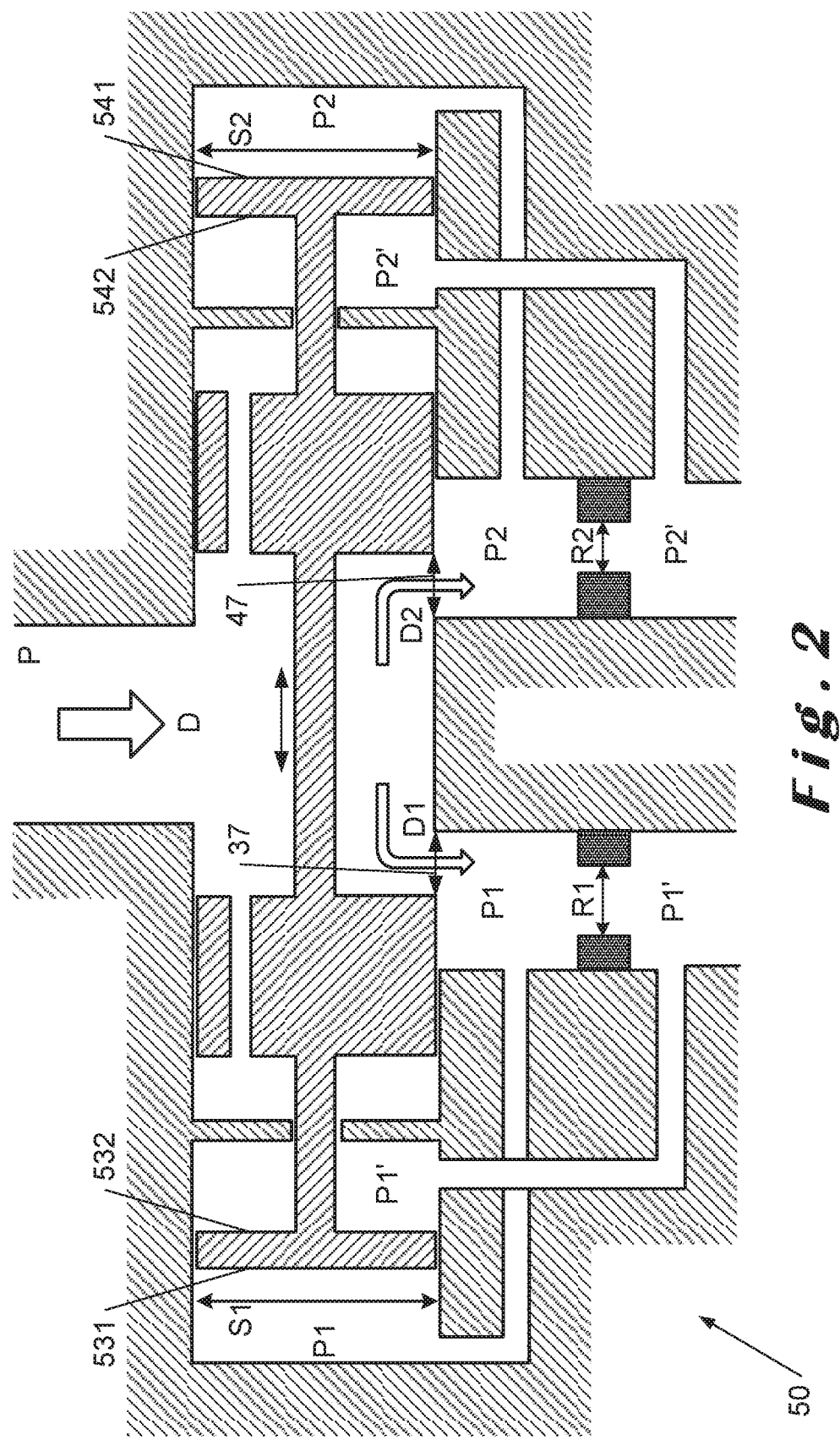
FIG. 2 illustrates another embodiment of the fluidic valve according to the disclosure.

FIG. 1 shows an embodiment of the fluidic valve 50 according to the disclosure. It comprises a hollow valve body 20 and three ways: an inlet 22, a first outlet 30 and a second outlet 40. The first outlet 30 of the valve 50 comprises a first outlet pipe which includes a first restriction 35. The first restriction 35 delimits an upstream cavity 33 of first outlet and a downstream cavity 34 of first outlet located on either side of the first restriction 35. The second outlet 40 of the valve 50 comprises a second outlet pipe which includes a second restriction 45. The second restriction 45 delimits an upstream cavity 43 of second outlet and a downstream cavity 44 of second outlet located on either side of the second restriction 45. The first restriction 35 in the first outlet 30 allows a pressure drop between the upstream cavity 33 of first outlet and the downstream cavity 34 of first outlet so as to have an indication of the flow rate in the first outlet 30. Thus, as shown in FIG. 2, the pressure P1 in the upstream cavity 33 of first outlet is different from the pressure P1' in the downstream cavity 34 of first outlet so that there is a pressure difference between P1 and P1'. P1 is greater than P1'.

The hollow valve body 20 comprises a first inner wall 23 comprising a first opening 23a, the inner wall 23 at least partially defining a first cavity. The hollow valve body 20 comprises a second inner wall 24 comprising a second opening 24a, the inner wall 24 at least partially defining a second cavity.

The fluidic valve 50 comprises a valve member 5 comprising a first end 53 located in the first cavity so as to at least partially delimit a first 31 and a third 32 chambers in the first cavity, and a second end 54 located in the second cavity so as to at least partially delimit a second 41 and a fourth 42 chambers in the second cavity. The valve member passes through the first 23 and second 24 inner walls via their first 23a and second 24a openings.

The valve member 5 in FIG. 1 comprises a first intermediate portion 51 and a second intermediate portion 52 each configured to at least partially block a passage between the inlet 22 and one of two outlets 30, 40. In the embodiment of FIG. 1, the first intermediate portion 51 and the first inner wall 23 at least partially delimit a first intermediate chamber 39 and the second intermediate portion 52 and the second inner wall 24 at least partially delimit a second intermediate chamber 49. The first intermediate portion 51 comprises a first intermediate fluid communication 13 between the first intermediate chamber 39 and the inlet 22, and the second intermediate portion 52 comprises a second intermediate fluid communication 14 between the second intermediate chamber 49 and the inlet 22.

The valve body in FIGS. 1 and 2 comprises:
- a first fluid communication 3133 for communicating a pressure P1 between the first chamber 31 and the upstream cavity 33 of first outlet;
- a second fluid communication 3234 for communicating a pressure P1' between the third chamber 32 and the downstream cavity 34 of first outlet;

a third fluid communication 4143 for communicating a pressure P2 between the second chamber 41 and the upstream cavity 43 of second outlet;

a fourth fluid communication 4244 for communicating a pressure P2' between the fourth chamber 42 and the downstream cavity 44 of second outlet.

The fluidic communications 3133, 3234, 4143, 4244 allow transfer of pressures P1, P1', P2, P2'. The fluidic communications 3133, 3234, 4143, 4244 have sufficient sections so that the transfer of the pressures P1, P1', P2, P2' is carried out with negligible pressure drops.

FIG. 2 shows the various flow rate, pressure and dimensional variables of certain elements of the valve 50 in operation. The valve is in operation when a flow rate D is imposed at inlet 20 of the valve 50. Thus, the flow rate D is distributed into a flow rate D1 to the first outlet 30 and a flow rate D2 to the second outlet 40. The flow rate D1 and the flow rate D2 are determined by the configuration of the valve 50 of the disclosure and in particular by the dimensions of the first 53 and second 54 ends as well as the passage sections of the first 35 and second 45 restrictions. The first end 53 delimiting the first 31 and third 32 chambers in the first cavity has a section having a first end area S1. The second end 54 delimiting the second 41 and fourth 42 chambers in the second cavity has a section having a second end area S2. The first restriction 35 has a first passage section R1, and the second restriction 45 has a second passage section R2.

As shown in FIGS. 1 and 2, the valve member 5 is symmetrical such that the first 53 and second 54 ends have sections of equal areas S1 and S2. The first end 53 is symmetrical with respect to the second end 54. It allows to have a flow rate distribution between the first 30 and second 40 outlets based on the relative dimensions of the first 35 and second 45 passage sections R1 and R2. Indeed when the valve member is symmetrical, i.e. S1 is equal to S2, then the position of the valve member 5 in relation to the first 30 and second 40 outlets is defined by the ratio between the passage sections R1 and R2 thanks to the pressure differences generated by the first 35 and second 45 restrictions, such as ΔP1=P1−P1' and ΔP2=P2−P2'. Thus, these pressure differences ΔP1 and ΔP2 act directly on the first 53 and second 54 end of the valve member. This is because the pressure P1 is exerted on the outer face 531 of the first end 53 of the valve member 5 and the pressure P1' is exerted on the inner face 532 of the first end 53 of the valve member 5. And, the pressure P2 is exerted on the outer face 541 of the second end 54 of the valve member 5 and the pressure P2' is exerted on the inner face 542 of the second end 54 of the valve member 5.

In general, the operation of the passive fluidic valve of the disclosure is based on an automatic balancing of ΔP1=P1−P1' and ΔP2=P2−P2'. When ΔP1=ΔP2 then the valve member 5 is in equilibrium and the flow rate distribution is that defined by the dimensioning of S1, S2, R1 and R2.=P2−P2' We do not want to balance P1 and P2, but (P1−P1') and (P2−P2') (in the case of S1=S2 and R1≠R2), because in this case the spool is in equilibrium, and the flow rate distribution is the desired one.

In FIGS. 1 and 2, the first restriction 35 of the first outlet 30 having a section R1 which is larger than the second restriction 45 of the second outlet 40 having a section R2, then:

the pressure P1 in the upstream cavity 33 of first outlet 33 is greater than a pressure P1' in the downstream cavity 34 of first outlet. Thus the valve member 5 is subjected to a displacement force due to the pressure P1 greater than the pressure P1' so that the valve member 5 (configured to at least partially block the passage between the inlet 22 and the outlets 30, 40) is displaceable so as to further block the first outlet 30 and less block the second outlet 40;

the pressure P2 in the upstream cavity 43 of second outlet is greater than a pressure P2' in the downstream cavity of second outlet 34. Thus the valve member 5 is subjected to a displacement force due to the pressure P2 greater than the pressure P2' so that the valve member 5 (configured to at least partially block the passage between the inlet 22 and the outlets 30, 40) is displaceable so as to further block the second outlet 40 and to less block the first outlet 30.

Thus, as the first restriction 35 of the first outlet 30 has a larger section R1 than the section R2 of the second restriction 45 of the second outlet 40, then, starting for example from a position of the valve member 5 with 50% of passage to the first outlet 30 and 50% passage to the second outlet 40, the pressure P2 is greater than the pressure P1. Such a pressure difference then causes a displacement force of the valve member 5 so as to balance the pressures P1 and P2 by increasing the passage to the first outlet 30 and consequently decreasing the passage to the second outlet 40. This then causes an increase in the flow rate D1 to the first outlet 30 and a decrease in the flow rate D2 to the second outlet 40. An increase in the flow rate D1 for the same section R1 of first restriction 35 causes a higher pressure P1 and conversely, a decrease in the flow rate D2 for the same section R2 of second restriction causes a decrease in pressure P2. Thus, the valve member 5, through the action of the displacement forces due to the pressures P1 and P2, quickly finds a position of equilibrium where the first 37 and second 47 variable restrictions between the first 30 and second 40 outlets allow the equilibrium of the pressures P1 and P2. This reasoning must be applied for a pressure P1' of downstream cavity 34 of first outlet and a pressure P2' of downstream cavity 44 of second outlet equal to P1'=P2', e.g. P1'=P2'=0 (without pressure drop in the pipes located downstream of the first 30 and second 40 outlets).

A modification of the pressure drops in the pipes located downstream of the first 30 and second 40 outlets will modify the pressures P1' and/or P2'. Such a change in these pressures will cause displacement forces on valve member 5 due to the action of the pressures P1' and/or P2' on the first 53 and/or second 54 ends as well as an increase in the pressures P1 and/or P2 and the inlet pressure P.

For example, in the embodiment of FIGS. 1 and 2 where R1 is greater than R2, an increase in the pressure drop in the pipe located downstream of the first outlet 30, mainly leads to an increase in P1' and also an increase in P1 and P at the inlet 22. This results in an increase in the displacement force of P1' on the valve member 5 so as to enlarge the first variable restriction 37 with the first outlet 30, which results in maintaining the flow D1 to the first outlet 30 and the flow D2 to the second outlet 40.

The valve member 5, irrespective of the examples cited, defines, for example, a first variable restriction 37 between the inlet 22 and the first outlet 30 and a second variable restriction 47 between the inlet 22 and the second outlet 40.

In different embodiments, S1, S2, R1, and R2 can be modified so as to define a valve 50 with an inlet flow rate D=D1+D2, the valve 50 having a flow rate ratio d in the range [0; 1], preferably d between 0.5 and 1 and even more preferably d between 0.9 and 1 such that:

d=D1/D2 for D1 in the range [0D; 0.5D] and D2 in the range [0.5D; 1D[, and d=D2/D1 for D1 in the range [0.5D; 1D] and D2 in the range ]0D; 0.5D].

For example, D1=60% and D2=40%.

The present disclosure has been described in relation to specific embodiments, which are purely illustrative and should not be considered as limiting. In general, the present disclosure is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of such elements. Reference numbers in claims shall not limit their scope.

The fluidic valve 50 is suitable, for example, for a hydraulic circuit of an equipment of an aircraft. In an embodiment, the valve 50 comprises:

a hollow valve body 20 comprising: an inlet 22, a first outlet 30 comprising a first restriction 35 delimiting an upstream cavity 33 of first outlet and a downstream cavity 34 of first outlet located on either side of the first restriction 35, a second outlet 40 comprising a second restriction 45 delimiting an upstream cavity 43 of second outlet and a downstream cavity 44 of second outlet located on either side of the second restriction 45, a first inner wall 23 comprising a first opening 23a and at least partially defining a first cavity, and a second inner wall 24 comprising a second opening 24a and at least partially defining a second cavity, a valve member 5 movable in the valve body 20 for at least partially blocking a passage between the inlet 22 and one of the two outlets 30, 40, passing through the first and second inner walls 23, 24 via their first and second openings 23a, 24a and comprising: a first end 53 located in the first cavity so as to at least partially delimit a first 31 and a third 32 chambers in the first cavity, a second end 54 located in the second cavity so as to at least partially delimit a second 41 and a fourth 42 chambers in the second cavity.

In some embodiments, the valve 50 comprises:

a first fluidic communication 3133 between the first chamber 31 and the upstream cavity 33 of first outlet;

a second fluid communication 3234 between the third chamber 32 and the downstream cavity 34 of first outlet;

a third fluid communication 4143 between the second chamber 41 and the upstream cavity 43 of second outlet;

a fourth fluid communication 4244 between the fourth chamber 42 and the downstream cavity 44 of second outlet.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A passive fluidic valve for a hydraulic circuit of an equipment of an aircraft comprising:
    a hollow valve body comprising:
        an inlet;
        a first outlet comprising a first restriction delimiting an upstream cavity of first outlet and a downstream cavity of first outlet;
        a second outlet comprising a second restriction delimiting an upstream cavity of second outlet and a downstream cavity of second outlet;
        a first cavity; and
        a second cavity,
    a valve member movable in the valve body configured to at least partially block a passage between said inlet and one of the two outlets, comprising:
        a first end located in the first cavity so as to at least partially delimit a first and a third chambers in said first cavity,
        a second end located in the second cavity so as to at least partially delimit a second and a fourth chambers in said second cavity,
    a first fluid communication between said first chamber and said upstream cavity of first outlet;
    a second fluid communication between said third chamber and said downstream cavity of first outlet;
    a third fluid communication between said second chamber and said upstream cavity of second outlet; and
    a fourth fluid communication between said fourth chamber and said downstream cavity of second outlet.

2. The fluidic valve according to claim 1, wherein said upstream cavity of first outlet is distinct from said upstream cavity of second outlet.

3. The fluidic valve according to claim 1, wherein said inlet on the one hand and said first and second outlets on the other hand are positioned upstream and downstream with respect to said valve member in a normal direction of fluid flow when the fluidic valve is in operation.

4. The fluidic valve according to claim 3, wherein the hollow valve body further comprises:
    a first inner wall comprising a first opening and at least partially defining said first cavity, and
    a second inner wall comprising a second opening and at least partially defining said second cavity,
    said valve member passing through said first and second inner walls via their first and second openings.

5. The fluidic valve according to claim 4, wherein the valve member further comprises:
a first and a second intermediate portions each configured to at least partially block a passage between said inlet and one of the two outlets, such that: said first intermediate portion at least partially delimits a first intermediate chamber with said first inner wall; and said second intermediate portion at least partially delimits a second intermediate chamber with said second inner wall.

6. The fluidic valve according to claim 5, comprising:
a first intermediate fluid communication between said first intermediate chamber and said inlet, and
a second intermediate fluid communication between said second intermediate chamber and said inlet.

7. The fluidic valve according to claim 5, wherein the first intermediate portion and the second intermediate portion form a first and a second variable restrictions with the first and second outlets respectively.

8. The fluidic valve according to claim 1, wherein said first end is fitted in said first cavity, and said second end is fitted in said second cavity, so that the first and second chambers are sealed from the third and fourth chambers respectively.

9. The fluidic valve according to claim 1, wherein:
said first end delimiting said first and third chambers in said first cavity has a section having a first end area S1, and
said second end delimiting said second and fourth chambers in said second cavity has a section having a second end area S2,
such that said first end area S1 is equal to said second end area S2.

10. The fluidic valve according to claim 1, wherein:
said first end delimiting said first and third chambers in said first cavity has a section having a first end area S1, and
said second end delimiting said second and fourth chambers in said second cavity has a section having a second end area S2,
such that said first end area S1 is larger than said second end area S2.

11. The fluidic valve according to claim 1, wherein:
said first restriction has a first passage section R1, and said second restriction has a second passage section R2,
such that said first passage section R1 is equal to said second passage section R2.

12. A hydraulic circuit for an equipment of an aircraft comprising the fluidic valve according to claim 1.

13. A fuel cell system comprising the fluidic valve according to claim 1.

14. A turbomachine for an aircraft comprising the fluidic valve according to claim 1.

15. An aircraft comprising the fluidic valve according to claim 1.

* * * * *